Oct. 22, 1940.  A. E. DRISSNER  2,219,008
COLLET
Filed Nov. 8, 1938
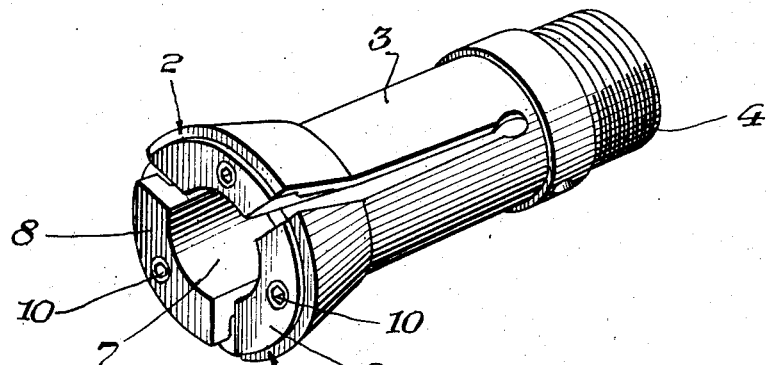
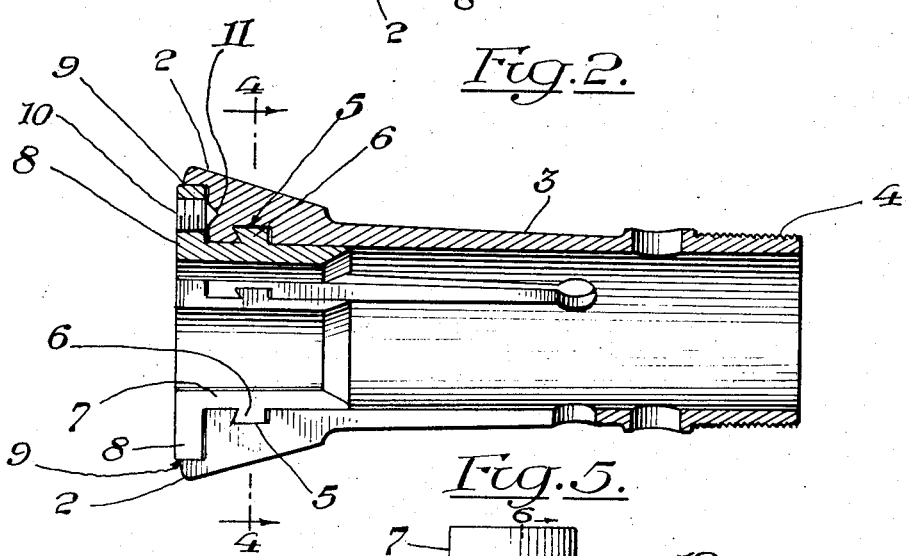
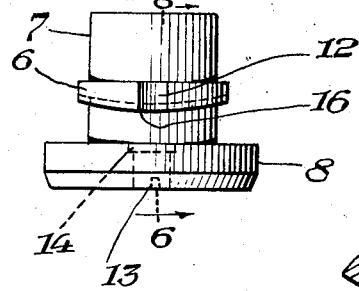
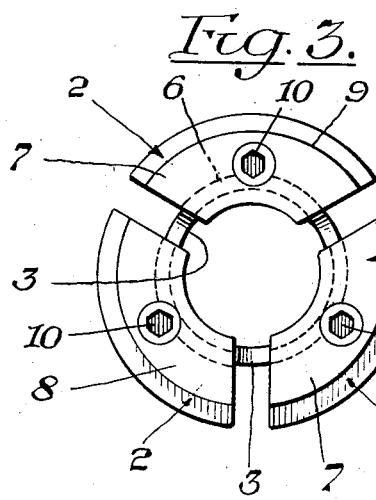
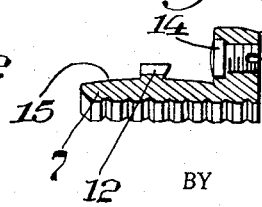
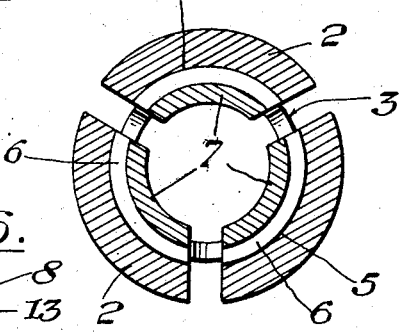
INVENTOR.
Alfred E. Drissner
BY
ATTORNEY.

Patented Oct. 22, 1940

2,219,008

UNITED STATES PATENT OFFICE 2,219,008

COLLET

Alfred E. Drissner, Cleveland, Ohio, assignor to The National Acme Company, Cleveland, Ohio, a corporation of Ohio Application November 8, 1938, Serial No. 239,461

16 Claims. (Cl. 279—46)

This invention relates to collets and more particularly to what are called master collets having removable gripping surfaces or pads, the object of the invention being to provide an improved collet and pad having improved means for securing the pad within the collet whereby they may be readily removed without removing the collet from the spindle or releasing the tubes in the machine which carry the collet.

In the use of these collets, for instance in multiple spindle machines, they are carried by tubes within the rotary spindles and, heretofore, in order to release the pads when they became worn, mutilated or broken, it has been necessary to release the collets from the tube for which purpose the tube had to be held back at the rear of the machine to permit the collet to be unscrewed from its tube so that the fastening devices or screws which usually went transversely through the collet to secure the pads could be removed to permit the removal of the pads.

These screws passing transversely through the collet and the pads also had to stand all the shock for driving and the shock when the stock bar is received by the collet as a result of which, the screws frequently were snapped off, requiring replacement and the consequent stoppage of the machine and delay incidental thereto.

In such prior constructions, the screws frequently became loose due to vibration and when the stock bars were pushed into the spindle and struck the back end of the pad, this also caused the screws to become loose and, as stated, also frequently to break off, all of which is avoided in the present construction since the shock of the bars striking the ends of the pads moving from the rear or back end thereof comes, not upon the screws but upon a rigid dove-tailed or wedge-shaped tongue and has no effect upon the screws to cause them to become loose or broken so that the shock of the drive comes not upon the screws as heretofore but upon a rigid shoulder of the pad, the taper form of which, due to its dove-tailed formation insures a bearing the full radius of the bore of the spring finger.

In the present improvement, the construction is such that the screws holding the pads in place are located at the forward end of the collet where they can be readily reached without the necessity of removing the collet from the tube and, therefore, without the necessity of holding the tube at the rear end of the machine and without any serious hold-up in the work of the machine for any length of time while the pads are being removed and replaced. Being located at the forward end of the collet, there is no danger of breakage from shock by the stock bars. This location, however, necessitates a particular formation of the pad and the improved construction is such in the present improvement that the screws do not receive the shock as heretofore. On the contrary, the shock is taken up by a shoulder or lug of a simple but strong design, by means of which, when the screws are in place, the pads will be forced into firm engagement with the spring jaws of the collet and efficiently locked in place.

In the drawing accompanying and forming a part of this specification,

Fig. 1 is a perspective view of this improved collet.

Fig. 2 is a longitudinal sectional view thereof.

Fig. 3 is a front end view of the collet.

Fig. 4 is a cross-sectional view taken on the line 4—4 of Fig. 2.

Fig. 5 illustrates a modification of the pad.

Fig. 6 is an cross-sectional view of Fig. 5 taken on the line 6—6 of Fig. 5.

Similar characters of reference indicate corresponding parts in the several views.

Before explaining in detail the present improvement and mode of operation thereof, I desire to have it understood that the invention is not limited to the details of construction and arrangement of parts illustrated in the accompanying drawing since the invention is capable of other embodiments, and that the phraseology employed is for the purpose of description and not of limitation.

This improved collet, in the preferred form thereof, comprises a plurality of spring fingers 2 shown as three in number usually formed by slotting a tube 3 provided at one end with threads 4 for attachment to the pusher tube of the machine. These fingers are flared outwardly and circumferentially curved and each is provided on its inner surface with a circumferentially located dove-tailed or wedge-shaped recess 5, thus providing a transverse undercut groove for the reception of a dove-tailed or wedge-shaped shoulder or undercut rib or tongue 6 carried on the outer wall of the replaceable jaw member or pad 7 which terminates at its forward end in a circumferentially located flange 8 conforming to the interior shape of the spring finger and for which purpose, the spring fingers are recessed as at 8 for the reception of this flange 8 whereby the pad has a bearing in a recess of the finger and also a bearing the full radius of the wall of the finger where the dovetailed tongue 6 engages in the similarly shaped recess 5 of the finger so that the shock of loading the collet during the feeding of the stock is received by this shoulder and not by the fastening screw as heretofore. The cooperation of these dove-tailed parts insures the correct location of the pad in the finger.

For securing the pad in place a screw 10 projects through the pad centrally thereof, the end of which fits into a drilled tapered opening 11 of the finger, the screw being centrally located in the small size of collet shown but any desired number of these screws which, in Figs. 1 to 3, are shown as hollow taper-nosed set or headless screws, may be used, this depending merely upon the size of the collet.

For instance, in a master collet such as hereinbefore referred to wherein the pads are interchangeable for different sizes of work, a larger number of screws would, of course, be used.

Thus, in the present instance, the screws can be readily reached at the front of the collet without the removal of the collet from its spindle or tube to get at the screws as was necessary heretofore when they extended transversely through the spring fingers into the pads.

In the modified form of the improvement shown in Figs. 5 and 6, the fastening screw instead of being inserted from the front end may be inserted from the rear side of the circumferential flange 8 for which purpose the tongue is milled with a small radius or groove as at 12 and the screw slot 13 in the forward end enables the screw to be released from the front of the collet, the screw being provided with a shoulder 14 near its end so that when the pad is loosened from the collet, this shoulder will hold the screw in place until the pad is put back in the collet and thus prevent it being lost, the head of the screw, of course, engaging the jaw or finger when the removable or interchangeable pad is in place.

In this form the shoulder and pad are curved transversely of each other as at 15 and 16 to permit a slight rocking movement if desired.

When the pad, in the present improvement, is properly located in position, the screw will pull the pad firmly with its dove-tailed tongue in engagement with the tapered wall of the finger recess and thus hold it firmly in position, in consequence of which, when a stock rod passes into the collet from the rear end thereof, the shock of that rod against the rear end of the pad will be taken up by the cooperating tapered or dove-tailed surfaces of the tongue and spring finger and not by the screw with the result that the tendency of the screw to work loose is avoided and breaking off of the screw eliminated while at the same time access to the screw without releasing the collet from its tube and the spindle is obtained at the front of the collet at all times.

The terms "dovetailed", "wedgeshaped" or "tapered" all have reference to and are intended to cover the inclined undercut faces of the parts 5 and 6, and the terms "drawing", "pulling" or "forcing" of these inclined undercut faces has reference to and are intended to cover the urging thereof into engagement.

It is to be understood that, by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made or all of the modes of its use, I claim:

1. A collet comprising a plurality of flaring spring fingers, each having a pair of circumferential recesses, one at the front and the other in the rear thereof, the latter having a tapered formation, a removable pad having a circumferential flange located in the forward recess, and a tapered circumferential tongue cooperating with the rearward recess, and means carried by the flange for securing the pad in place.

2. A collet comprising a plurality of flaring spring fingers, each having a pair of circumferential recesses, one at the front and the other in the rear thereof, the latter having a tapered formation, a removable pad having a circumferential flange located in the forward recess, and a tapered circumferential tongue cooperating with the rearward recess, and means carried by the flange for securing the pad in place, said means extending through the front of the flange from the front side thereof.

3. A collet comprising a plurality of flaring spring fingers, each having a pair of circumferential recesses, one at the front and the other in the rear thereof, the latter having a tapered formation, a removable pad having a circumferential flange located in the forward recess, and a tapered circumferential tongue cooperating with the rearward recess, and means carried by the flange for securing the pad in place, said means extending into the flange from the rear thereof and said tongue having a radius for the passage of said means.

4. A collet comprising a plurality of spring fingers and removable pads, each finger and pad having a cooperating circumferential flange and recess and in the rear thereof cooperating tapered surfaces, and means located at the front of the collet for securing the pad to its finger.

5. A collet for hollow spindles comprising a tubular member longitudinally slotted to form a plurality of resilient segments, each segment having a conical external face for engagement with a conical recess in the spindle, replaceable jaw members for said resilient segments, a transverse under cut rib and a transverse undercut groove for receiving the same the one on said segment and the other on said jaw member, and means operable from the outer end of said collet for positively clamping said rib in said groove.

6. A collet for hollow spindles comprising a tubular member longitudinally slotted to form a plurality of resilient segments, each segment having a conical external face for engagement with a conical recess in the spindle, replaceable jaw members for said resilient segments, a transverse undercut rib integral with said jaw member and a transverse undercut groove in said segment for receiving said rib, and a screw operable from the end of said collet for clamping said rib in engagement with said groove.

7. A collet having spring fingers and removable pads, each pad and its finger having complemental tapered undercut surfaces, and rotatable means carried by the pad and located at the front of the collet and extending lengthwise of the collet for drawing said undercut surfaces into engagement, thereby to urge the pad radially outwardly into direct engagement with its spring finger and exert a pressure opposed to said undercut surfaces.

8. A collet pad comprising a circumferential part having on its outer wall a flange having a tapered undercut circumferential face adapted to engage a complemental face of the collet to urge the pad radially outwardly into position when the pad is shifted axially in the collet and in front of said flange a circumferential flange of greater diameter than said flange.

9. A collet pad comprising a circumferential part having on its outer wall a tapered undercut shoulder adapted to engage a complemental face of the collet to urge the pad radially outwardly into position when the pad is shifted axially in the collet, said pad and shoulder transversely curved of each other.

10. A collet pad comprising a circumferential part having a pair of circumferential flanges, one in front of the other and one having a tapered undercut face adapted to engage a complemental face of the collet to urge the pad radially outwardly into position when the pad is shifted axially in the collet.

11. A collet pad comprising a circumferential part having a pair of circumferential flanges, one in front of the other and one having a tapered undercut and curved face adapted to engage a complemental face of the collet to urge the pad radially outwardly into position when the pad is shifted axially in the collet.

12. A collet pad comprising a circumferential part having on its outer wall a rib having a tapered undercut face adapted to engage a complemental face of the collet to urge the pad radially outwardly into position when the pad is shifted axially in the collet, said rib and pad curved transversely of each other, and a circumferential flange of greater diameter than said rib and located in front thereof.

13. A collet having spring fingers and removable pads, each finger and pad having cooperating tapered undercut surfaces, and rotatable means accessibly located at the front of the collet for drawing said undercut surfaces into engagement thereby to urge the pad radially outwardly into direct engagement with its spring finger.

14. A collet having spring fingers and removable pads, each finger and pad having cooperating tapered undercut surfaces, and rotatable means accessibly located at the front of the collet for drawing said undercut surfaces into engagement thereby to urge the pad radially outwardly into direct engagement with its spring finger, each pad also having a flange adjacent its front end.

15. A collet having a plurality of flaring spring fingers, each having a pair of circumferential recesses, one in front of the other, one having a tapered undercut face, a removable pad for each finger and having a circumferential flange located in the forward recess and a circumferential tongue, one having a complemental undercut face cooperating with the undercut face of the undercut recess, and means accessible from the front of the collet for drawing said undercut surfaces into engagement thereby to urge the pad radially outwardly into direct engagement with its spring finger.

16. A collet having a plurality of spring jaw members, removable pad members for said jaw members, said jaw and pad members having radially extending complemental tapered undercut abutment surfaces coacting with each other for camming said pad members radially outwardly on said jaw members when urged into engagement with each other, one of said members having a threaded bore and a screw in each bore accessible at the front of its jaw member and engageable with the other member for urging said abutment surfaces into engagement with each other.

ALFRED E. DRISSNER.